US005101629A

United States Patent [19]

Sugiyama et al.

[11] Patent Number: 5,101,629

[45] Date of Patent: Apr. 7, 1992

[54] HYDRAULIC CIRCUIT SYSTEM FOR WORKING MACHINE

[75] Inventors: Genroku Sugiyama, Ibaraki; Toichi Hirata, Ushiku, both of Japan

[73] Assignee: Hitachi Construction Machinery Co., Ltd., Tokyo, Japan

[21] Appl. No.: 499,457

[22] PCT Filed: Feb. 19, 1990

[86] PCT No.: PCT/JP90/00193

§ 371 Date: Jul. 2, 1990

§ 102(e) Date: Jul. 2, 1990

[87] PCT Pub. No.: WO90/09528

PCT Pub. Date: Aug. 23, 1990

[30] Foreign Application Priority Data

Feb. 20, 1989 [JP] Japan .................................. 1-38325

[51] Int. Cl.[5] .............................................. F16D 31/00

[52] U.S. Cl. ........................................ 60/459; 60/494; 91/508; 91/447

[58] Field of Search ................ 60/420, 426, 427, 445, 60/433, 452, 459, 463, 494, 698, 706; 91/508, 517, 518, 446, 447

[56] References Cited

U.S. PATENT DOCUMENTS

| | | | |
|---|---|---|---|
| 3,992,883 | 11/1976 | Cope | 60/494 |
| 4,020,867 | 5/1977 | Sumiyoshi | 91/446 |
| 4,425,759 | 1/1984 | Krusche | 60/420 |
| 4,487,018 | 12/1984 | Budzich | 60/452 |
| 4,508,013 | 4/1985 | Barbagli | 91/518 |
| 4,617,854 | 10/1986 | Kropp | 91/517 |
| 4,884,402 | 12/1989 | Strenzke et al. | 60/433 |
| 4,938,023 | 7/1990 | Yoshino | 91/518 |
| 4,967,557 | 11/1990 | Izumi et al. | 60/426 |
| 5,048,293 | 9/1991 | Aoyagi | 60/452 |

FOREIGN PATENT DOCUMENTS

| | | |
|---|---|---|
| 57-116965 | 7/1982 | Japan . |
| 59-197603 | 11/1984 | Japan . |
| 60-11706 | 1/1985 | Japan . |

*Primary Examiner*—Edward K. Look
*Assistant Examiner*—Hoang Nguyen
*Attorney, Agent, or Firm*—Fay, Sharpe, Beall, Fagan, Minnich & McKee

[57] ABSTRACT

A hydraulic circuit system comprising a hydraulic-fluid supply source, at least one hydraulic actuator operated by hydraulic fluid from the hydraulic-fluid supply source, a flow control valve for controlling the flow of the hydraulic fluid to be supplied to the actuator and a pressure control element for maintaining the differential pressure across the flow control valve at a predetermined value. The system according to the present invention comprises: first element for selectively creating, from the load pressure of the actuator and the supply pressure of the hydraulic-fluid supply source, either the pressure which is the same as the load pressure or the intermediate pressure which is higher than the load pressure but lower than the supply pressure and transmitting it as the control pressure; second element for operating said first element for instructing to select either the pressure which is the same as the load pressure or the intermediate pressure; and connection element for introducing the control pressure to the pressure control element. The pressure control element maintains the above-described differential pressure at the predetermined value when the level of the control pressure is the same as that of the load pressure, while it makes the level of the differential pressure lower than the predetermined value when the control pressure is the intermediate pressure.

13 Claims, 7 Drawing Sheets

HYDRAULIC CIRCUIT SYSTEM FOR WORKING MACHINE

FIELD OF THE INVENTION

The present invention relates to a hydraulic circuit system for a working machine such as a hydraulic excavator and a hydraulic crane, and, more particularly, to a hydraulic circuit system for a working machine provided with pressure control means for maintaining the differential pressure across the flow control valve at a predetermined value.

BACKGROUND OF THE INVENTION

A portion of working machines has a plurality of working members necessary for performing a predetermined operation. The working machine of the type described above is exemplified by a hydraulic excavator. That is, the hydraulic excavator comprises a lower travel body for moving the hydraulic excavator, an upper swing which is placed on the lower travel body such that it can be rotated and a front mechanism comprising a boom, an arm and a bucket. The upper swing has a variety of equipments such as an operation room, a prime mover, a hydraulic pump and the like mounted thereon, the above-described front mechanism being further disposed thereon.

As one of the hydraulic circuit system for use in the working machine of the type described above, there has been a system called "a load sensing system". The system is arranged in such a manner that only the quantity of hydraulic fluid necessary for operating the actuator is delivered from the hydraulic pump by controlling the pump delivery rate such that the level of the pump delivery pressure is higher than the level of the load pressure of the hydraulic actuator.

In recent years, a variety of the load sensing systems have been disclosed. For example, a hydraulic circuit system has been disclosed in JP,A, 57-116965 in which a pressure controller is disposed in the downstream side of a flow control valve for controlling the flow of hydraulic fluid to be supplied to the actuator, the pressure controller being operated in response to the maximum load pressure of a plurality of actuators so as to maintain the differential pressure across the flow control valve at a predetermined value. Another hydraulic circuit system has been disclosed in JP,A, 60-11706 in which it is arranged in such a manner that a pressure compensating valve for maintaining the differential pressure across the flow control valve at a predetermined value is disposed in the upstream side of the flow control valve. In this disclosure, the pressure compensating valve is, as an alternative to the spring, provided with means for causing the pump delivery pressure and the maximum load pressure to interact with each other so as to set the above-described predetermined value by the differential pressure between the levels of the pump delivery pressure and the maximum load pressure. Since the differential pressure across the flow control valve is controlled as described above, the rate of the flow passing through each of the flow control valves, that is, the supply flow rate to each of the actuators can be controlled to the value corresponding to the operation amount (the demanded flow rate) of the operating lever at the time of the combined operation. Furthermore, the speed ratio among a plurality of actuators can be properly controlled so that a smooth combined operation is enabled.

However, the above-described conventional hydraulic circuit system arises the following problems:

In general, the working machine is sometimes used in such a manner that the operation speed of the hydraulic actuator thereof is considerably lowered. For example, in the case of the hydraulic excavator, the following operations are the operations of the type described above: an operation for scraping the surface of the ground, the leveling work, an operation for making a slope (collectively called "fine operations" hereinafter). In the above-described operations, it is apparent that the operation can be easily completed if change in the flow rate to be supplied to the actuator (flow rate passing through the flow control valve) with respect to the operation amount of the operating lever of the actuator is significantly small.

In the fine operation performed by the hydraulic circuit system having no load sensing system, the change in the supply flow rate to the actuator with respect to the operation amount of the operating lever can be reduced by lowering the revolution speed of the prime mover for operating the hydraulic pump and an operator can thereby easily perform the fine operation. However, in the hydraulic circuit system employing the load sensing system, control is performed as described above in such a manner that the control for maintaining the differential pressure across the flow control valve at the predetermined value is performed. Therefore, even if the revolution speed of the prime mover is lowered, the supply flow rate is determined in accordance with the operation amount of the operating lever. Therefore, the change rate of the supply flow rate with respect to the operation amount of the operating lever is not changed, causing the low speed control of the actuator by means of the operating lever to become difficult to be performed. Therefore, the fine operation cannot be conducted easily.

On the other hand, a technology has been disclosed in U.S. Pat. No. 4,487,018 in which an external control signal is supplied to the pressure control means for maintaining the differential pressure across the flow control valve at a predetermined value so as to change the predetermined value. However, the above-described conventional technology has not discussed about the way of making the control signal.

An object of the present invention is to provide a hydraulic circuit system for a working machine capable of performing a fine operation even if the load sensing system is employed therein.

SUMMARY OF THE INVENTION

In order to achieve the above-described object, according to the present invention, there is provided a hydraulic circuit system for a working machine having a hydraulic-fluid supply source, at least one hydraulic actuator operated by hydraulic fluid from the hydraulic-fluid supply source, a flow control valve for controlling the flow of the hydraulic fluid to be supplied to the actuator; and pressure control means for maintaining the differential pressure across the flow control valve at a predetermined value, the hydraulic circuit system being characterized by: first means for selectively creating, from load pressure of the actuator and supply pressure from the hydraulic-fluid supply source, either pressure which is the same as the load pressure or intermediate pressure higher than the load pressure but lower than the supply pressure and transmitting the created pressure as control pressure; second means for operating the first means for instructing to select, as the control pressure, either the pressure which is the same as the load pressure or the intermediate pressure; and connection means for introducing the control pressure into the pressure control means, whereby the pressure control means maintains the differential pressure at the predetermined value when the the control pressure is the same as the load pressure, while it makes the differential pressure lower than the predetermined value when the control pressure is the intermediate pressure.

At the normal operation, selection of the pressure which is the same as the load pressure as the control pressure is instructed by the second means. The first means selects the corresponding pressure in response to the instruction as the control pressure and transmits it. The thus transmitted control pressure is introduced into the pressure control means via the connection means. As a result, the pressure control means maintains the differential pressure across the flow control valve at the predetermined value so that the normal flow rate control is performed. On the other hand, at the time of the fine operation, selection of the intermediate pressure as the control pressure is instructed by the second means. The first means selects the intermediate pressure in response to the instruction as the control pressure and transmits it. The thus transmitted control pressure is introduced into the pressure control means via the connection means. As a result, the pressure control means makes the differential pressure across the flow control valve smaller than the predetermined value. Therefore, change in the supply flow rate passing through the flow control valve with respect to the operation amount of the operating lever is reduced. As a result, the fine operation can be easily conducted.

It is preferable that the structure be arranged in such a manner that the first means comprises a conduit having an end portion to which the load pressure is introduced and another end portion to which the supply pressure is introduced, a fixed throttle and a variable throttle disposed in the conduit, the second means includes means for adjusting the opening of the variable throttle and the connection means is connected to a portion between the fixed throttle and the variable throttle of the conduit. It is preferable that the structure be arranged in such a manner that the fixed throttle is disposed in a portion of the conduit to which the load pressure is introduced, the variable throttle is disposed in a portion of the conduit to which the supply pressure is introduced, the second means closes the variable throttle when the load pressure is selected, and it opens the variable throttle to a given opening when the intermediate pressure is selected.

A structure may be employed which is arranged in such a manner that the first means includes a conduit having an end portion to which the load pressure is introduced and another end portion to which the supply pressure is introduced, a fixed throttle and a variable pressure-control valve disposed in the conduit, the second means includes means for adjusting a setting value of the variable pressure-control valve and the connection means is connected to a portion between the fixed throttle and a variable pressure control valve in the conduit. It is preferable that the structure be arranged in such a manner that the variable pressure-control valve is disposed in a portion of the conduit to which the load pressure is introduced, the fixed throttle is disposed in a portion of the conduit to which the supply pressure is introduced, the second means makes the setting value of the variable pressure control valve zero when the load pressure is selected, and it changes the setting value of the variable pressure control valve to a given value other than zero.

A structure may be employed in which the first means includes means for detecting the load pressure, means for detecting the supply pressure, means for calculating the control pressure from the detected load pressure and supply pressure and means arranged to be controlled in accordance with the calculated control pressure for generating the control pressure.

It is preferable that the structure be arranged in such a manner that the second means includes means operated by an operator for operating the first means.

A structure may be employed in which the hydraulic-fluid supply source includes a hydraulic pump and a prime mover for operating the hydraulic pump and the second means includes means for operating the first means in accordance with the revolution speed of the prime mover. It is preferable that the structure be arranged in such a manner that the second means includes means for operating the first means in synchronization with means for instructing target revolution speed of the prime mover. A structure may be employed in which the second means includes means for detecting the actual revolution speed of the prime mover and means for operating the first means in accordance with the thus detected actual revolution speed.

In the case where the first means includes means for calculating the control pressure from the detected load pressure and supply pressure, it is preferable that the structure be arranged in such a manner that the second means includes means for transmitting information serving as the base of the selection and the means for calculates the control pressure receives the information and calculates either the pressure which is the same as the load pressure or the intermediate pressure as the control pressure in accordance with the received information.

The pressure control means may include a pressure controller disposed in the downstream side of the flow control valve and may include a pressure compensating valve disposed in the upstream side of the flow control valve.

Other and further objects, features and advantages of the invention will be appear more fully from the following description.

DESCRIPTION OF THE PREFERRED EMBODIMENTS

Preferred embodiments of the present invention will be described with reference to the drawings, referring to a hydraulic excavator as the working machine.

First embodiment

A first embodiment of the present invention will now be described with reference to FIGS. 1 and 2.

Structure

Figure 1:
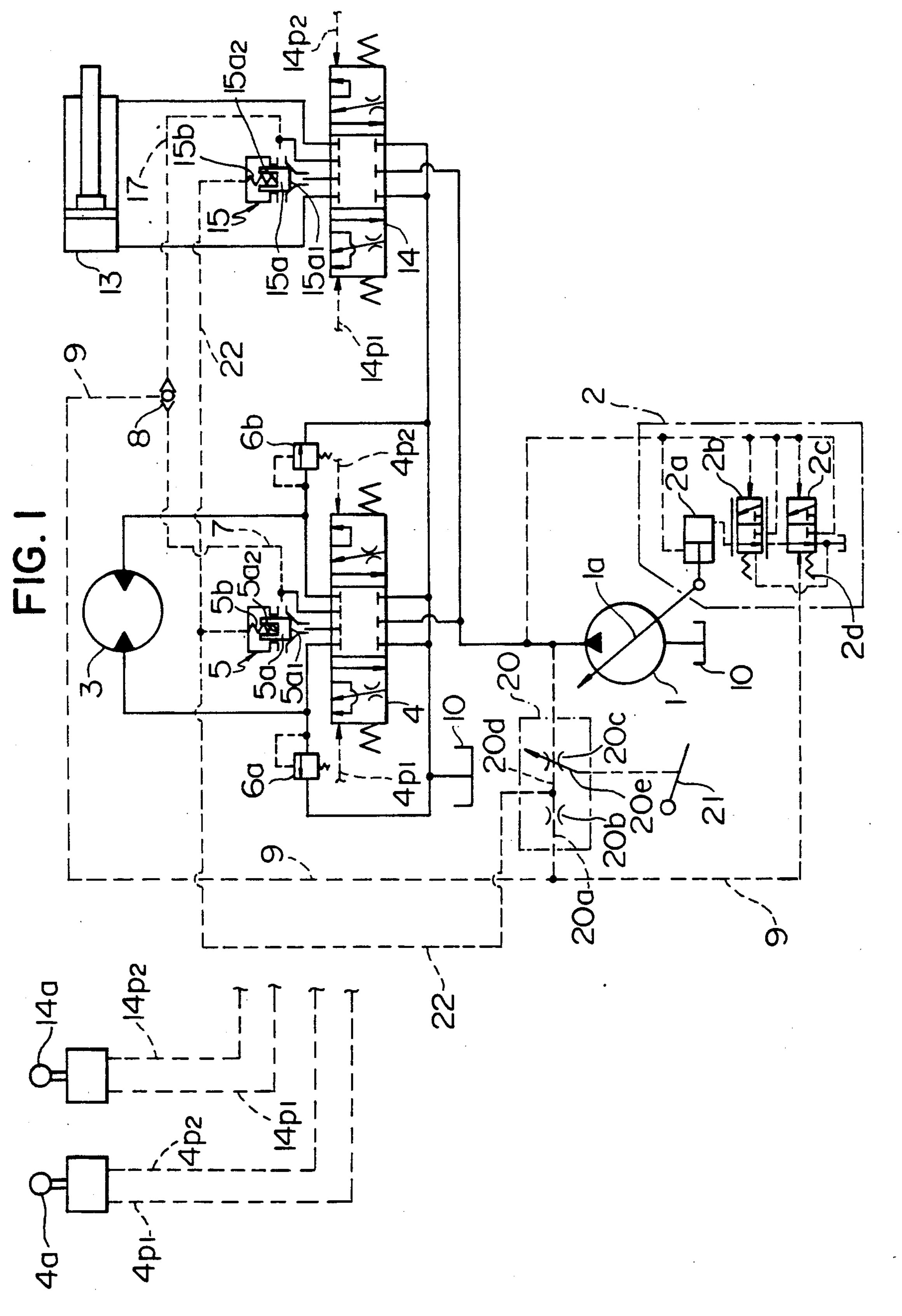
FIG. 1 is a schematic view which illustrates a first embodiment of a hydraulic circuit system according to the present invention.

Referring to FIG. 1, reference numeral 1 represents a variable displacement hydraulic pump which comprises a displacement varying mechanism (to be represented by "a swash plate" hereinafter) 1*a* the operation of which is controlled by a regulator 2. The regulator 2 comprises a hydraulic cylinder 2*a* for operating the swash plate 1*a*, a control valve 2*b* for performing power limiting control and another control valve 2*c* which performs load-sensing control.

A swinging motor 3 for operating the upper swing of a hydraulic excavator and a boom cylinder 13 for operating the boom are connected to the hydraulic pump 1 so that a hydraulic circuit system is constituted.

The operation of the swinging motor 3 is controlled by a flow control valve 4. The flow control valve 4 has drive sections connected to pilot conduits 4*p*1 and 4*p*2 so that pilot pressure corresponding to the operation amount of an operating lever 4*a* for the swing is introduced into one of the drive sections via the conduit 4*p*1 or 4*p*2 when the operating lever 4*a* is operated. As a result, the variable throttle of the flow control valve 4 is set to the opening corresponding to the operation amount.

A pressure controller 5 for maintaining the differential pressure across the variable throttle of the flow control valve 4 at a predetermined value is disposed in the downstream side of the variable throttle of the flow control valve 4. The pressure controller 5 comprises a piston 5*a* for adjusting the flow passage area and a spring 5*b* for urging the piston 5*a* with low pressure in a direction in which the flow passage area is reduced. The piston 5*a* comprises a first pressure-receiving surface 5*a*1 on which the pressure of hydraulic fluid which has passed through the variable throttle of the flow control valve 4 acts and a second pressure-receiving surface 5*a*2 on which control pressure, to be described later, acts. The ratio between the area of the first pressure-receiving surface 5*a*1 and that of the second pressure-receiving surface 5*a*2 is, for example, 1. The hydraulic fluid which has passed through the pressure controller 5 is returned to the flow control valve 4 and is then supplied from it to the main circuit of the swinging motor 3 in accordance with the operating direction of the flow control valve 4. Relief valves 6*a* and 6*b* are provided for the main circuit of the swinging motor 3 so as to control the maximum load pressure of the swinging motor 3.

The operation of the boom cylinder 13 is controlled by a flow control valve 14. The flow control valve 14 has drive sections connected to pilot conduits 14*p*1 and 14*p*2 so that pilot pressure corresponding to the operation amount of the operating lever 4*a* for the boom is introduced into one of the drive sections via the conduit 14*p*1 or 14*p*2 when the operating lever 14*a* is operated. As a result, the variable throttle of the flow control valve 14 is set to the opening corresponding to the operation amount. A pressure controller 15 for maintaining the differential pressure across the variable throttle of the flow control valve 14 at a predetermined value is disposed in the downstream side of the variable throttle of the flow control valve 14. The structure of the pressure controller 15 is the same as that of the pressure controller and comprises a piston 15*a* and a spring 15. The piston 15*a* comprises a first pressure-receiving surface 15*a*1 and a second pressure-receiving surface 15*a*2. The area ratio between the first and the second pressure-receiving surfaces 15*a*1 and 15*a*2 is also determined to be 1.

Detection conduits 7 and 17 respectively introducing the load pressure of the swinging motor 3 and that of the boom cylinder 13 are connected to the exit side of the corresponding pressure controllers 5 and 15. The higher load pressure from the two detection conduits 7 and 17 is selected by a shuttle valve 8 so as to be transmitted to a detection conduit 9. Reference numeral 10 represents a reservoir.

The flow control valve 4 and the pressure controller 5 may be integrated and also the flow control valve 14 and the pressure controller 15 may be integrated.

The control valve 2*c* of the regulator 2 has a drive section to which the load pressure from the detection conduit 9 is introduced and another drive section to which the delivery pressure from the hydraulic pump 1 is introduced. Therefore, the control valve 2*c* is operated in accordance with the balance between the differential pressure and the urging force of a spring 2*d*, the differential pressure being the difference in the pressure between the load pressure and the delivery pressure.

Reference numeral 20 represents a pressure-generating section comprising: a conduit 20*a* having an end portion to which the load pressure from the detection conduit 9 is introduced and another end portion to which the delivery pressure from the hydraulic pump 1 is introduced; a fixed throttle 20*b* disposed on the side of the conduit 20*c* to which the load pressure is introduced; and a variable throttle 20*c* disposed on the side of the conduit 20*c* to which the pump delivery pressure is introduced. The variable throttle 20*c* comprises a throttle-opening adjustment member 20*e* the position of which can be adjusted by an operating lever. That is, the opening of the variable throttle 20*c* is adjusted to a value which corresponds to the operation amount of the operating lever 21. A portion 20*d* of the conduit 20*a* between the fixed throttle 20*b* and the variable throttle 20*c* is, via a control conduit 22, connected to chambers of the pressure controller 5 and 15 in which the second pressure-receiving surfaces 5*a*2 and 15*a*2 are positioned.

As a result of the thus constituted structure, when the operating lever 21 is in a position at which the variable throttle is closed, the pressure of the portion 20*d* of the conduit 20*a* becomes the same pressure as the load pressure of the detection conduit 9. When the opening of the variable throttle 20*c* is set to a given degree due to the operation of the operating lever 21, a small-rate of hydraulic fluid flow is generated in the direction from the variable throttle 20*c*, via the conduit portion 20*d*, the fixed throttle 20*b*, the detection conduit 9, the shuttle valve 8, the detection conduit 7 or 17, to the exit portion of the pressure controller 5 or 16. Therefore, pressure of the intermediate level between the level of the load pressure corresponding to the opening of the variable throttle 20 and the pump delivery pressure is generated in the conduit portion 20*d*. The thus generated pressure is, as the control pressure, transmitted to the control conduit 22 so as to act on the second pressure-receiving surfaces 5*a*2 and 15*a*2 of the pressure controllers 5 and 15.

As described above, the pressure-generating section 20 is constituted so as to selectively generates either the pressure which is the same as the load pressure of the detection conduit 9 or the intermediate pressure between the load pressure and the pump delivery pressure, the thus selective-generated pressure being transmitted as the control pressure..

Operation

Then, the operation of the present invention thus constituted will now be described.

An operator operates the operating lever 21 so as to close the variable throttle 20*c* of the pressure-generating section 20 at the time of the normal operation. When the upper swing is desired to be swung at the time of the normal operation, the operator operates the operating lever 4*a*. As a result, hydraulic pressure is generated in either the pilot conduits 4*p*1 or 4*p*2, for example, in the pilot conduit 4*p*1 so that the flow control valve 4 is switched to the left side, when viewed in the drawing, by the opening corresponding to the operation amount of the operating lever 4*a*. Therefore, the hydraulic fluid from the hydraulic pump 1 presses the first pressure-receiving surface 5*a*1 of the piston 5*a* of the pressure controller 5 via the variable throttle of the flow control valve 4, causing the piston 5*a* to be lifted. The hydraulic fluid then passes through the pressure controller 5, and again passes through the flow control valve 4. The hydraulic fluid is then supplied to the swinging motor 3 through its left main conduit when viewed in the drawing. As a result, the swinging motor 3 starts swinging in a certain direction. In this case, since the magnitude of inertia of the upper swing is extremely large, the major portion of the hydraulic fluid to be supplied to the swinging motor 3 is discharged into the reservoir 10 through the relief valve 6*a*. Furthermore, the load pressure allowed to appear in the detection conduit 7 becomes the predetermined pressure level for the relief valve 6*a*. The above-described load pressure is introduced into one side of the control valve 2*c* of the regulator 2 via the detection conduit 9 so as to try to enlarge the tilting amount of the swash plate 1*a*. However, the high load pressure of the swinging motor 3 causes for the switch valve 2*b* for controlling the power of the regulator 2 to prevent the enlargement of the tilting amount of the swash plate 1*a*. Therefore, the delivery rate of the hydraulic pump 1 is also limited.

When the swinging motor 3 has been gradually accelerated as described above, the quantity of the hydraulic fluid relieved from the relief valve 6*a* is gradually reduced according to the acceleration of the swinging motor 3. The load pressure is rapidly lowered to the level considerably lower than the predetermined value for the relief valve 6*a* after the rotation speed of the swinging motor 3 has substantially reached the speed corresponding to the opening of the flow control valve 4. The control valve 20*c* of the regulator 2 controls the delivery rate so as to maintain the differential pressure between the delivery pressure of the hydraulic pump 1 and the load pressure at the predetermined value defined by the spring 2*d*, the control valve 20*c* controlling the delivery rate in accordance with the above-described low load pressure.

In the above-described state, if the load pressure has been raised due to an external load or the like, the differential pressure between the pump delivery pressure and the load pressure becomes reduced. The raised load pressure is introduced into the control valve 2*c* of the regulator 2, causing the hydraulic cylinder 2*a* to be operated so as to enlarge the delivery flow rate of the hydraulic pump 1. As a result, the pressure in the upstream side of the flow control valve is raised and the differential pressure thereof is caused to return to the predetermined value defined by the spring 2*d*. That is, even if the load pressure has been raised, the differential pressure between the pump delivery pressure and the load pressure is maintained at the predetermined value. Therefore, the swinging motor 3 is supplied with the flow rate corresponding to the operation amount of the operating lever 4*a* regardless of the increase in the load pressure. The operation in the case where the load pressure has been lowered is conducted contrary to the above-described operation and the flow rate corresponding to the operation amount of the operating lever 4*a* is similarly supplied to the swinging motor 3.

On the other hand, in the above-described sole operation of the swinging motor 3, since the variable throttle 20*c* of the pressure-generating section 20 has been closed, pressure which is the same as the load pressure of the detection conduit 9, that is, pressure which is the same as the load pressure of the swinging motor 3 is generated in the conduit portion 20*d*. The thus generated pressure acts on the second pressure-receiving surface 5*a*2 of the piston 5*a* of the pressure controller 5. As a result, the piston 5*a* is pressed by the hydraulic fluid which has passed through the variable throttle of the flow control valve 4 so that it is retained at the substantially fully-opened state. Furthermore, the above-described fully-opened state is continued even if the load pressure is changed. That is, the pressure controller 5 does not operate in the sole operation of the swinging motor 3.

The sole operation of the boom cylinder 13 is conducted similarly to the above-described operation.

Then, the operation at the time of a combined operation, in which the swinging motor 3 and the boom cylinder 13 are simultaneously operated, will be described. When the operating levers 4*a* and 14*a* are simultaneously operated, the flow control valves 4 and 14 are opened by the openings corresponding to the operation amounts of the operating levers 4*a* and 14*a*. As a result, hydraulic fluid is supplied to the swinging motor 3 and the boom cylinder 13. Therefore, the swinging motor 3 and the boom cylinder 13 are simultaneously operated. The higher load pressure selected from that of the swinging motor 3 and that of the boom cylinder 13, for example, that of the swinging motor 3 by the shuttle valve 8 is transmitted to the detection conduit 9. The thus transmitted load pressure is introduced into one side of the control valve 2*c* of the regulator 2 so that the delivery flow rate of the hydraulic pump 1 is controlled in such a manner that the differential pressure between the introduced load pressure and the pump delivery pressure is maintained at a predetermined value.

As a result of the control thus performed, the differential pressure between the pump delivery pressure and the load pressure of the boom cylinder 13 which is the lower load pressure side becomes a value larger than the above-described predetermined value. Therefore, if no measure is taken, the delivery flow rate from the hydraulic pump 1 is preferentially supplied to the boom cylinder 13 which is the lower load pressure side. As a result, the flow rate to be supplied to the swinging motor 3 which is the higher load pressure side should be excessively limited, causing the operation of the swinging motor 3 to become difficult. In order to overcome the above-described problem, the pressure controller 15 is operated so as to maintain the differential pressure across the variable throttle of the flow control valve 14 at the predetermined value.

That is, the load pressure of the detection conduit 9, that is the pressure which is the same as the load pressure of the swinging motor 3, is generated in the pressure-generating section 20 in this state. The pressure acts on the second pressure-receiving surface 5*a*2 of the piston 15*a* of the pressure controller 15. Therefore, the piston 15*a* is urged in the direction in which the flow passage area is restricted, causing the pressure in the downstream side of the variable throttle of the flow control valve 14 to be raised. As a result, control is conducted in such a manner that the differential pressure across the variable throttle of the flow control valve 14 is made the same as the differential pressure between the pump delivery pressure and the load pressure of the swinging motor 3. Therefore, the differential pressure across the variable throttle of the flow control valve 14 is maintained at the predetermined value. In this state, the piston 5*a* of the pressure controller 5 is fully opened as described made about the sole operation.

Therefore, both the differential pressure of the flow control valve 4 and that of the flow control valve 14 are maintained at the same predetermined value, preventing the hydraulic fluid from being preferentially supplied to the boom cylinder 14 which is the lower load pressure side. As a result, the above-described problem in that the difficulty in operation of the swinging motor 3 which is the higher load pressure side can be overcome. Therefore, the flow rate to be supplied to the swinging motor 3 and to the boom cylinder 13 can be controlled to the value corresponding to the operation amount of the operating levers 4*a* and 14*a*. Furthermore, the speed ratio of these actuators 3 and 13 can be controlled in accordance with the operation amount of the operating levers 4*a* and 14*a*. Therefore, smooth combined operation can be performed.

In a fine operation, the operator operates the operating lever 21 so as to open the variable throttle 20*c* of the pressure generating section 20 to the opening which corresponds to the operation amount of the operating lever 21. As a result, the intermediate pressure between the load pressure of the detection conduit 9 and the pump delivery pressure is, as described above, generated in the conduit portion 20*d*. The thus generated intermediate pressure is, as the control pressure, transmitted to the control conduit 22, and is supplied to the second pressure-receiving surfaces 5*a*2 and 15*a*2 of the pressure controllers 5 and 15. Therefore, in the case where, for example, the boom cylinder 13 is solely operated, the piston 15*a* of the pressure controller 15 is urged in the direction in which the flow passage area is restricted. As a result, the pressure in the downstream side of the variable throttle of the flow control valve 14 is raised so that the differential pressure across the variable throttle of the flow control valve 14 becomes smaller than the predetermined value in the above-described normal operation. Then, control is conducted in such a manner that the small differential pressure is made constant. Namely, the predetermined value of the differential pressure across the variable throttle of the flow control valve 14 has been replaced by a smaller value by opening the variable throttle 20*c* to a certain opening.

Figure 2:
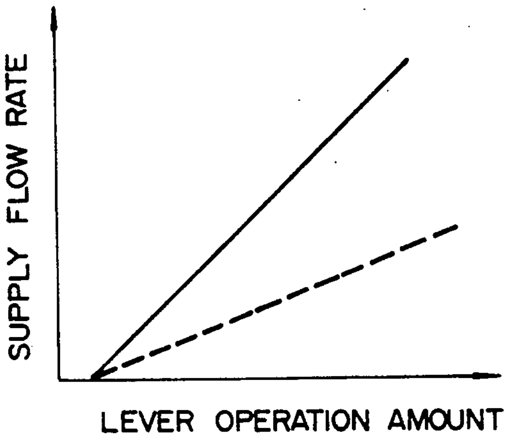
FIG. 2 illustrates the relationship between the operation amount of a control lever and the change in the supply rate to an actuator.

As described above, since the differential pressure is lowered, the change in the flow rate to be supplied to the actuator with respect to the operation amount of the operating lever as designated by a continuous line shown in FIG. 2 in the case where the differential pressure is maintained at the predetermined value as it is, is made smaller as designated by a short dashes line. Therefore, even if the operation amount of the operating lever 14*a* is the same, the quantity of the hydraulic fluid to be supplied to the boom cylinder 13 is made smaller in comparison to the supply quantity at the normal operation. As a result, the fine operation can be readily performed.

The operation at the time of the sole operation of the swinging motor 3 and that at the time of the combined operation of the swinging motor 3 and the boom cylinder 13 are performed similarly to the above-described operation.

Advantages

As described above, according to the present invention, the opening of the variable throttle 20*c* connected to the delivery conduit of the hydraulic pump 1 is adjusted by the operation of the operating lever 21 at the time of a fine operation so as to cause the raised pressure which is the intermediate pressure between the load pressure and the pump delivery pressure to act, as the control pressure, on the pressure controllers 5 and 15. Therefore, the predetermined value of the differential pressures across the flow control valves can be made smaller, causing change in the quantity of the hydraulic fluid to be supplied to the swinging motor 3 and to the boom cylinder 13 with respect to the operation amount of the operating levers 4*a* and 14*a* to be made smaller. As a result, the fine operation can be readily performed.

According to this embodiment, the above-described control pressure is formed from the existing pressures, the load pressure and the pump delivery pressure, by adding the pressure-generating section 20 and the operating lever 21 having relatively simple structures. Therefore, an efficient system can be constituted.

Although the operating lever 21 and the adjustment member 20*e* of the variable throttle 20*c* are mechanically synchronized with each other according to this embodiment, another structure capable of giving the same effect may be employed in which the operating lever 21 is replaced by an operation member for generating a hydraulic pressure signal or an electric signal with which the adjustment member 20*e* of the variable throttle 20*c* is operated.

Second Embodiment

A second embodiment of the present invention will be described with reference to FIG. 3 in which similar elements to those shown in FIG. 1 are given the same reference numerals. This embodiment is characterized in that pressure control means of different types are employed so as to maintain the differential pressure across the flow control valve at the predetermined value.

Figure 3:
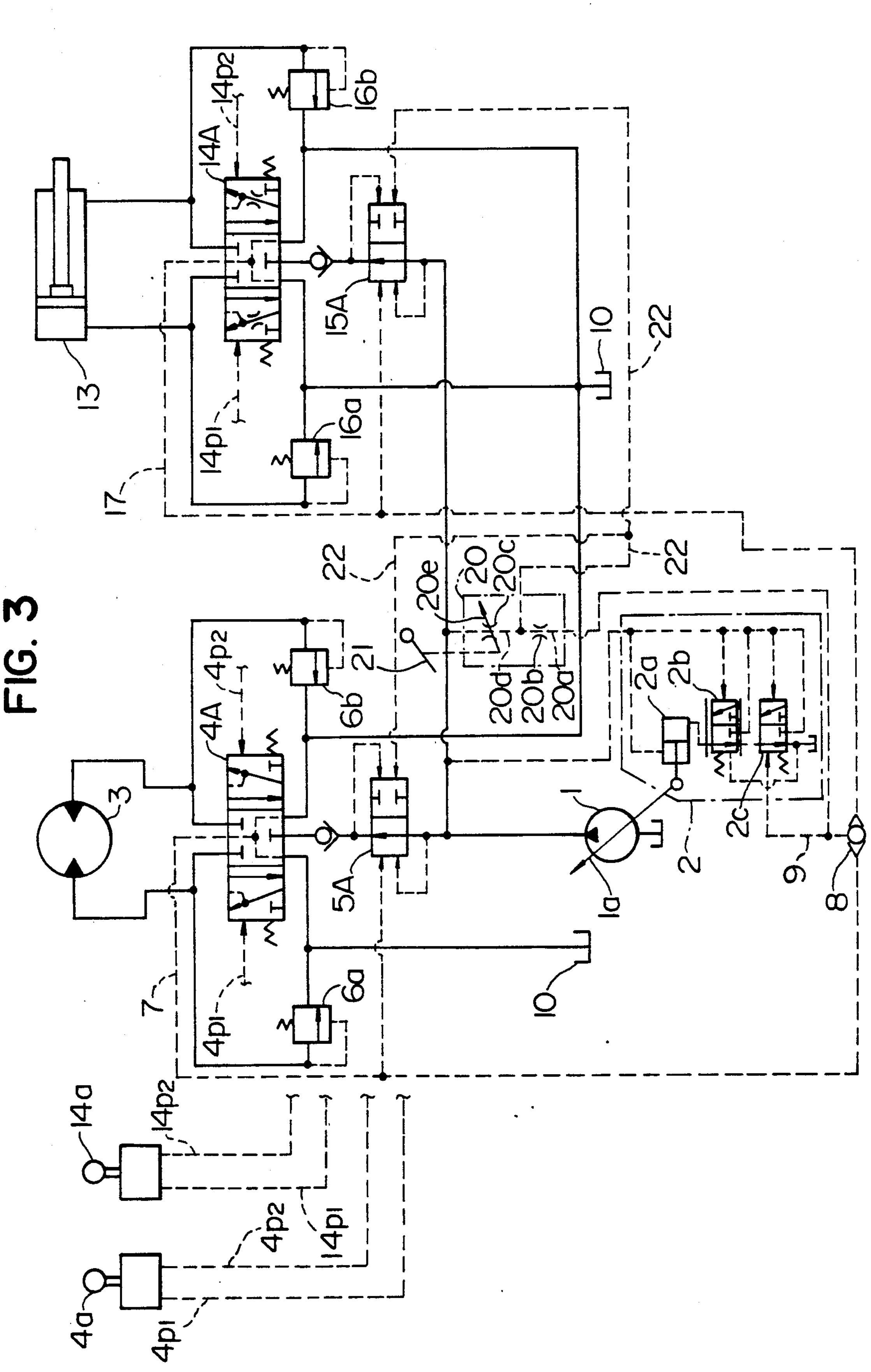
FIG. 3 is a schematic view which illustrates a second embodiment of the hydraulic circuit system according to the present invention.

Referring to FIG. 3, the pressure controllers 5 and 15 according to the first embodiment are replaced by pressure compensating valves 5A and 15A disposed in the upstream side of the flow control valves 4 and 14. The pressure compensating valve 5A receives, in one of the drive sections thereof, the delivery pressure from the hydraulic pump 1 and the load pressure of the swinging motor 3, that is, the supply pressure of the flow control valve 4. On the other hand, the other drive section of the pressure compensating valve 5A receives the pressure at the inlet side of the flow control valve 4 and the control pressure generated by the pressure-generating section 20. In order to employ the pressure compensating valves 5A and 15A, the switching structures of the flow control valves 4A and 14A are adapted.

Then, the operation of this embodiment will be described. The handling and the operation of the pressure-generating section 20 are the same as those according to the first embodiment. That is, the variable throttle 20*c* is closed at the normal operation. The pressure of the conduit portion 20*d* of the pressure-generating section 20 becomes the same as the load pressure of the detection conduit 9. Therefore, the pressure which is the same as the above-described load pressure acts, as the control pressure, on the drive sections of the pressure compensating valves 5A and 15A via the conduit 22. At the time of the fine operation, the operating lever 21 is operated so as to open the variable throttle 20*c* by the opening corresponding to the operation amount of the operating lever 21. The conduit portion 20D of the pressure-generating section 20 generates the intermediate pressure between the load pressure of the detection conduit 9 and the pump delivery pressure. The thus generated intermediate pressure acts, as the control pressure, on the drive sections of the pressure compensating valves 5A and 15A via the conduit 22.

The pressure compensating valves 5A and 15A are provided, as an alternative to a spring for setting the compensating differential pressure (the target value of the differential pressure across the flow control valve) in the conventional pressure compensating valve, with means for acting the differential pressure between the pump delivery pressure and the control pressure generated in the pressure-generating section 20. Therefore, when the control pressure is the same as the load pressure, the differential pressure between the pump delivery pressure and the load pressure acts on the pressure compensating valve and the structure in this case becomes the same as disclosed in JP,A, 60-11706. The pressure compensating valves 5A and 15A act with the above-described differential pressure which has been load-sensing controlled by the regulator 2 being applied as the compensating differential pressure, so that control is conducted in such a manner that the differential pressures across the flow control valves 4A and 14A coincide with the above-described differential pressure. On the other hand, when the control pressure is the intermediate level, the pressure compensating valves 5A and 15A act with the differential pressure between the pump delivery pressure and the above-described intermediate pressure being applied as the compensating differential pressure, s that control is conducted in such a manner that the differential pressures across the flow control valves 4A and 14A coincide with the above-described differential pressure.

Namely, the pressure compensating valves 5A and 15A respectively maintain the differential pressures across the flow control valves 4A and 14A at the same predetermined value which is substantially the same as the differential pressure between the pump delivery pressure and the load pressure at the time of the normal operation. On the other hand, at the time of the fine operation, the differential pressures across the flow control valves 4A and 14A are maintained at the same predetermined value which is smaller than the above-described predetermined value. Therefore, the pressure compensating valves 5A and 15A perform substantially the same functions as those of the pressure controllers 5 and 15 although the difference lies in that the pressure compensating valves 5A and 15A are positioned in the upstream side of the flow control valve.

Therefore, this embodiment gives substantially the same effect as that obtained in the first embodiment. That is, in any case of the sole operation of the swinging motor 3, the sole operation of the boom cylinder 13 and the combined operation of the swinging motor 3 and the boom cylinder 13, the differential pressure across the flow control valve 4A and/or 14A is maintained at the same predetermined value which is the same as the differential pressure between the pump delivery pressure and the load pressure at the time of the normal operation, while the above-described differential pressure across the flow control valve 4A and/or 14A is maintained at the predetermined value which is smaller than that at the normal operation. Therefore, the change in the quantity of hydraulic fluid to be supplied to the swinging motor 3 and the boom cylinder 13 with respect to the operation amount of the operating levers 4*a* and 14*a* is reduced. As a result, the fine operation can be conducted easily.

Third embodiment

A third embodiment of the present invention will be described with reference to FIG. 4 in which similar elements to those shown in FIG. 1 are given the same reference numerals. This embodiment is characterized in that the structure of the pressure-generating section is changed.

Figure 4:
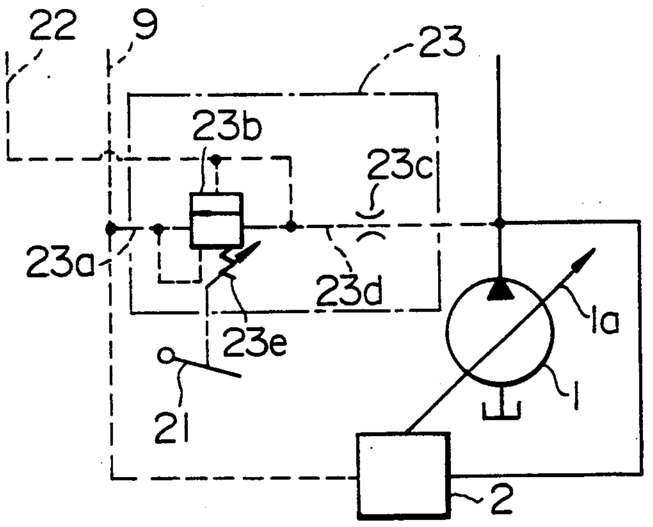
FIG. 4 is a schematic view which illustrates an essential portion of a third embodiment of the hydraulic circuit system according to the present invention.

Referring to FIG. 4, a pressure-generating section 23 according to this embodiment comprises: a conduit 23*a* having an end portion to which the load pressure of the detection conduit 9 is introduced and another end portion to which the delivery pressure from the hydraulic pump 1 is introduced; a variable pressure control valve 23*b* positioned on the side of the conduit 23*a* to which the load pressure is introduced; and a fixed throttle 23*c* disposed on the side of the conduit 23*a* to which the pump delivery pressure is introduced. The pressure control valve 23*b* has a spring 23*e* whose strength can be adjusted by the operating lever 21. That is, a setting value of the spring 23*e* is adjusted to the value corresponding to the operation amount of the operating lever 21 by the operation of the same. A portion of the conduit 23*a* between the pressure control valve 23*b* and the fixed throttle 23*c* is, via the control conduit 22, connected to the chambers of the pressure controllers 5 and 15 (see FIG. 1) in which the second pressure-receiving surfaces 5*a*2 and 15*a*2 are positioned.

When the operating lever 21 is in a position at which the setting value of the spring 23*e* becomes zero, a small-rate of hydraulic fluid flow is generated in the direction from the fixed throttle 23*c*, via the conduit portion 23*d*, the pressure control valve 23*b*, the detection conduit 9, the shuttle valve 8 shown in FIG. 1 and the detection conduit 7 or 17 to the exit portion of the pressure controller 5 or 16. At this time, balance is kept at which the pressure control valve 23*b* is substantially fully opened. Therefore, the pressure at the position 23*d* of the conduit 23a becomes the same as the load pressure at the detection conduit 9. When the setting value of the spring 23e of the pressure control valve 23b is changed to a given value other than zero by the operation of the operating lever 21, the intermediate pressure between the load pressure and the pump delivery pressure corresponding to the determined value of the pressure control valve 23b is generated in the conduit portion 23d due to the small rate flow of the hydraulic fluid. The thus generated intermediate pressure in the conduit portion 23d is delivered, as the control pressure, to the control conduit 22.

Similarly to the pressure generating section 21 according to the first embodiment, the pressure-generating portion 23 selectively creates either the pressure which is the same as the load pressure of the detection conduit 9 or the intermediate pressure between the load pressure and the pump delivery pressure in accordance with the instruction by means of the operation of the operating lever 21. The thus selectively created pressure is transmitted as the control pressure. Therefore, a similar effect to that obtained in the first embodiment can be obtained according to this embodiment.

Fourth embodiment

A fourth embodiment of the present invention will be described with reference to FIG. 5 in which the similar elements to those shown FIG. 1 are given the same reference numerals. This embodiment is characterized in that a structure for operating the pressure generating section comprises a structure other than the operating lever.

Figure 5:
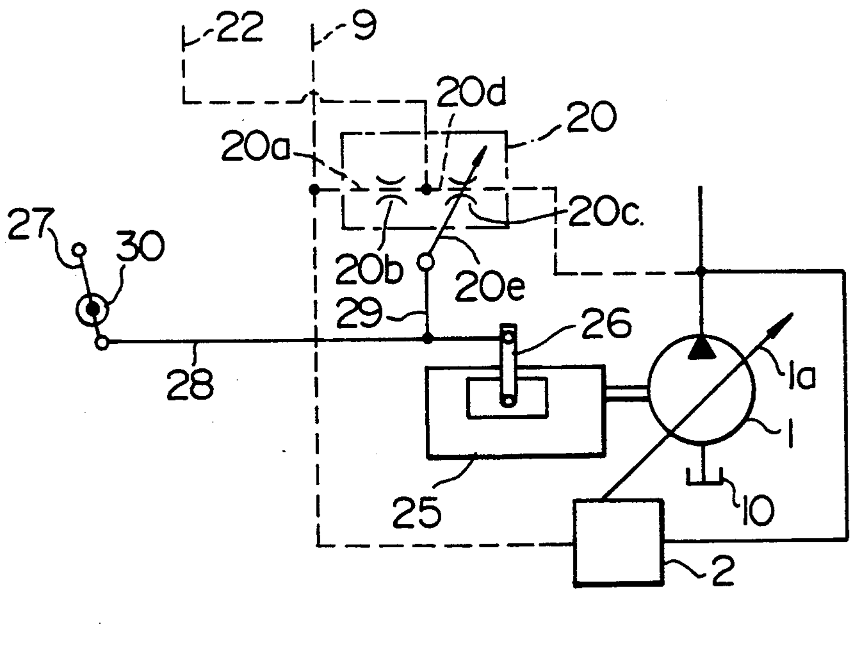
FIG. 5 is a schematic view which illustrates an essential portion of a fourth embodiment of the hydraulic circuit system according to the present invention.

Referring to FIG. 5, reference numeral 25 represents a prime mover for operating the hydraulic pump 1 and comprising a governor 26 for adjusting the injection amount. The injection amount for the prime mover 25 is varied by a fuel lever 27 which is connected to a governor lever 26 via a rod 28. The rod 28 is connected, at its intermediate position, to the adjustment member 20e of the variable throttle 20c of the pressure-generating section 20 via a rod 29. The fuel lever 27 has a friction plate 30 at its pivoting portion so as to be set to a desired position.

When the fuel level 27 is operated to the position at which the target revolution speed of the prime mover 25 is raised, the adjustment member 20e is also operated. As a result, the variable throttle 20c is closed, causing the control pressure which is the same as the load pressure of the detection conduit 9 to be transmitted to the control conduit 22. When the fuel lever 27 is operated to the position at which the target revolution speed of the prime mover 25 is lowered, the adjustment member 20e is also operated. As a result, the opening of the variable throttle 20c is enlarged to a given opening which corresponds to the operation amount of the fuel lever 27. As a result, the intermediate pressure between the load pressure corresponding to the opening of the variable throttle 20 and the pump delivery pressure is generated in the conduit portion 20d, the intermediate pressure being transmitted, as the control pressure, to the control conduit 22.

In general, the target revolution speed of the prime mover 25 is set to high speed at the time of the normal operation since the operation can be conducted with the operating speed of the hydraulic actuator raised. On the other hand, the target revolution speed of the prime mover 25 is usually set to low speed at the time of the fine operation since the operating speed of the hydraulic actuator is intended to be lowered.

Therefore, in this embodiment, the differential pressure across the flow control valve is maintained at the predetermined value which is substantially the same as the differential pressure between the pump delivery pressure and the load pressure at the time of the normal operation, while the above-described differential pressure is maintained at a value smaller than the predetermined value for the normal operation at the time of the fine operation. Therefore, the change in the quantity of the hydraulic fluid to be supplied to the hydraulic actuator with respect to the operation amount of the operating lever can be reduced. As a result, the fine operation can be conducted easily.

Furthermore, according to this embodiment, since the opening of the variable throttle 20c is adjusted in synchronization with the fuel lever 27, the variable throttle 20c can be adjusted without any special operating lever. Therefore, the structure can be further simplified and the handling facility can be improved.

Although the fuel lever 27 and the adjustment member 20e of the variable throttle 20c are mechanically synchronized with each other according to this embodiment, another structure may be employed in which the operation of the fuel lever 27 is detected as an hydraulic pressure signal or an electric signal with which the adjustment member 20e of the variable throttle 20c is operated.

Fifth embodiment

A fifth embodiment of the present invention will be described with reference to FIGS. 6 to 8. Similar elements to those shown in FIGS. 1 and 5 are given the same reference numerals. This embodiment is characterized in that electronic control for obtaining the level of the control pressure by its calculations is employed.

Figure 6:
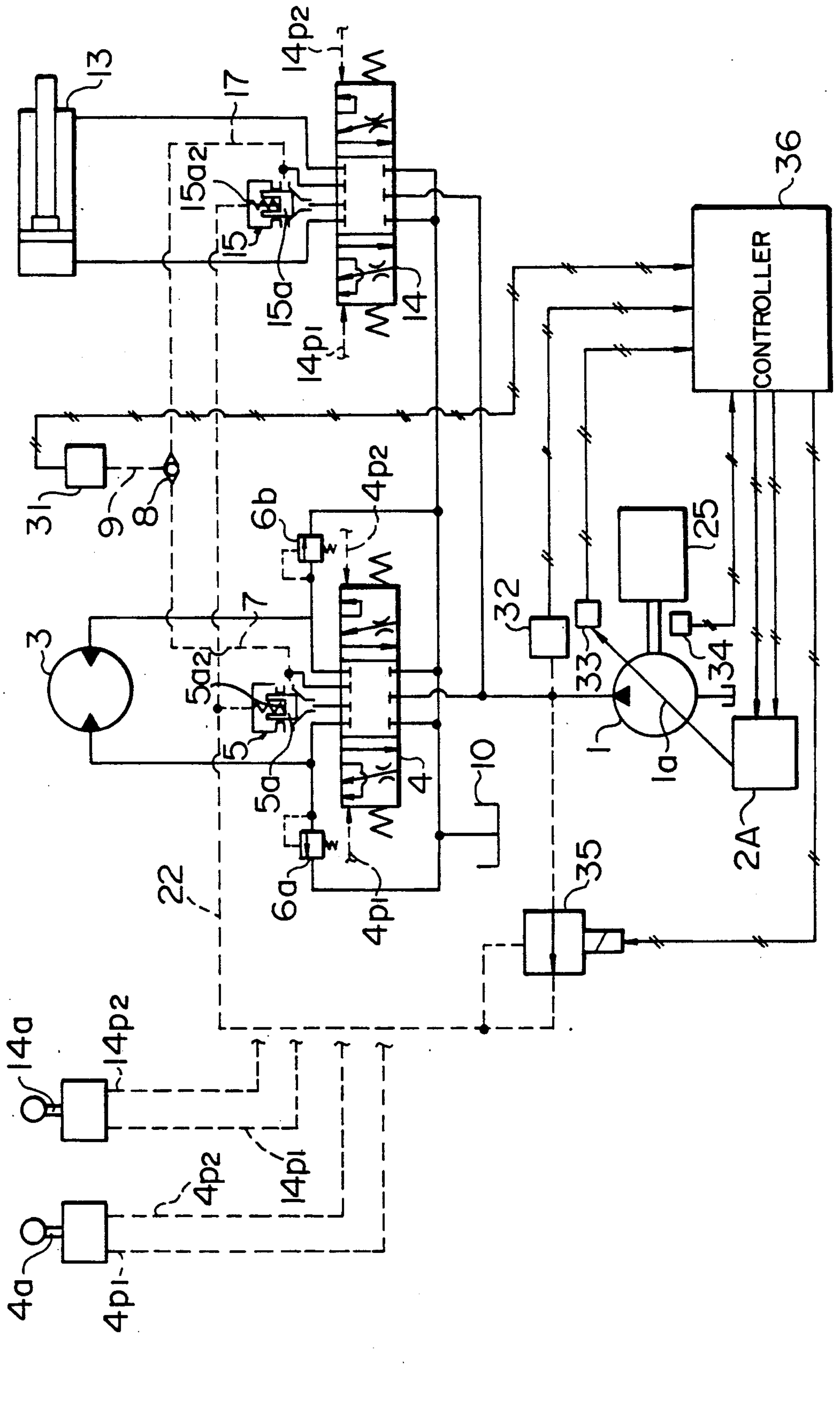
FIG. 6 is a schematic view which illustrates a fifth embodiment of the hydraulic circuit system according to the present invention.

Referring to FIG. 6, a pressure sensor 31 for detecting the load pressure of the detection conduit 9 is connected to the detection conduit 9. Another pressure sensor 32 for detecting the pump delivery pressure is connected to the delivery conduit of the hydraulic pump 1. Each of the above-described pressure sensors 31 and 32 transmits an electric signal which has been formed by converting the thus detected pressure. A position sensor 33 for detecting the tilting amount of the swash plate 1a of the hydraulic pump 1 is provided for the swash plate 1a. Furthermore, a revolution-speed sensor 34 for detecting the revolution speed of the prime mover is provided in the vicinity of the output shaft of the prime mover 25 for operating the hydraulic pump 1. Each of the above-described sensors 33 and 34 transmits an electric signal formed by converting the thus detected tilting amount or the revolution speed. On the other hand, a regulator 2A is arranged to be of a electric-hydraulic servo type. Furthermore, a solenoid proportional valve 35 is connected to the delivery conduit of the hydraulic pump 1, while the control conduit 22 is connected to the output port of the solenoid proportional valve 35. The electric signals from the sensors 31, 32, 33 and 34 are supplied to a controller 36 in which predetermined calculations are performed so that corresponding control signals are supplied to the regulator 2A and the solenoid proportional valve 35.

Figure 7:
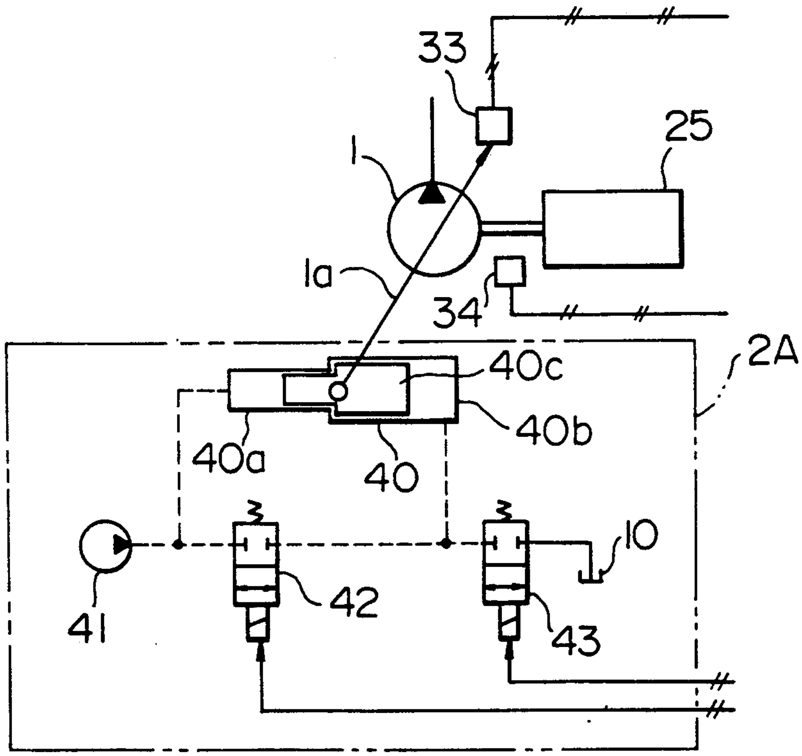
FIG. 7 illustrates the detailed structure of the regulator shown in FIG. 6.

FIG. 7 illustrates the structure of the regulator 2A. Referring to FIG. 7, reference numeral 40 represents an actuator for operating the swash plate 1a of the hydraulic pump 1. The actuator 40 comprises: two cylinder chambers 40*a* and 40*b* each of which has a different pressure-receiving area; and a piston 40*c* reciprocating in the cylinder chambers 40*a* and 40*b* so as to adjust the tilting amount of the swash plate 1*a*. The cylinder chamber 40*a* is connected to a pilot pump 43 serving as a hydraulic pressure source, while the cylinder chamber 40*b* is connected to the pilot pump 43 and the reservoir 10 via normal-close first and second solenoid valves 42 and 43.

The control signal transmitted from the controller 36 is supplied to the solenoid valves 42 and 43. When the control signal is supplied to the solenoid valve 42, the solenoid valve 42 is opened, causing the hydraulic fluid from the pilot pump 41 is supplied to both the cylinder chambers 40*a* and 40*b*. The piston 40*c* is moved to the left when viewed in FIG. 7 due to the difference in the pressure-receiving area between the cylinder chambers 40*a* and 40*b*. Therefore, the tilting amount of the swash plate 1*a* is reduced and the delivery flow rate from the hydraulic pump 1 is also reduced. When the control signal is supplied to the solenoid valve 43, the solenoid valve 43 is opened, causing the cylinder chamber 40*b* to be connected to the reservoir 10. As a result, the piston 40*c* is moved to the right when viewed in FIG. 7. Thus, the tilting amount of the swash plate 1*a* is increased, and the delivery flow rate from the hydraulic pump 1 is also increased.

The controller 36 calculates the differential pressure between the load pressure and the pump delivery pressure from those detected by the pressure sensors 31 and 32. The controller 36 calculates, from the value thus calculated, a first target tilting amount for maintaining the above-described differential pressure at a predetermined value. Furthermore, the controller 36 calculates, from the pump delivery pressure detected by the pressure sensor 32, a second target tilting amount for power limiting control. The smaller target tilting amount is selected as a command value for the tilting amount from the first and the second target tilting amount. The controller then transmits a control signal to one of the solenoid valves 42 or 43 in accordance with the result of the comparison made between the above-described command value for the tilting amount and the actual tilting amount of the swash plate 1*a* detected by the position sensor 33. As a result, the swash plate 1*a* is operated as described above, and thus the power limiting control for the hydraulic pump 1 and the load-sensing control for maintaining the differential pressure between the pump delivery pressure and the load pressure at the predetermined value are performed. As for the detailed description about the above-described control, see, for example, JP,A, 1-312202.

The controller 36 calculates the control pressure to act on the second pressure-receiving surfaces 5*a*2 and 15*a*2 of the pistons 5*a* and 15*a* of the pressure controllers 5 and 15 from the load pressure and the pump delivery pressure detected by the pressure sensors 31 and 32 and the revolution speed of the prime mover 25 detected by the revolution-speed sensor 34. The controller 36 transmits an electric signal corresponding to the thus calculated control pressure to the solenoid proportional valve 35.

Figure 8:
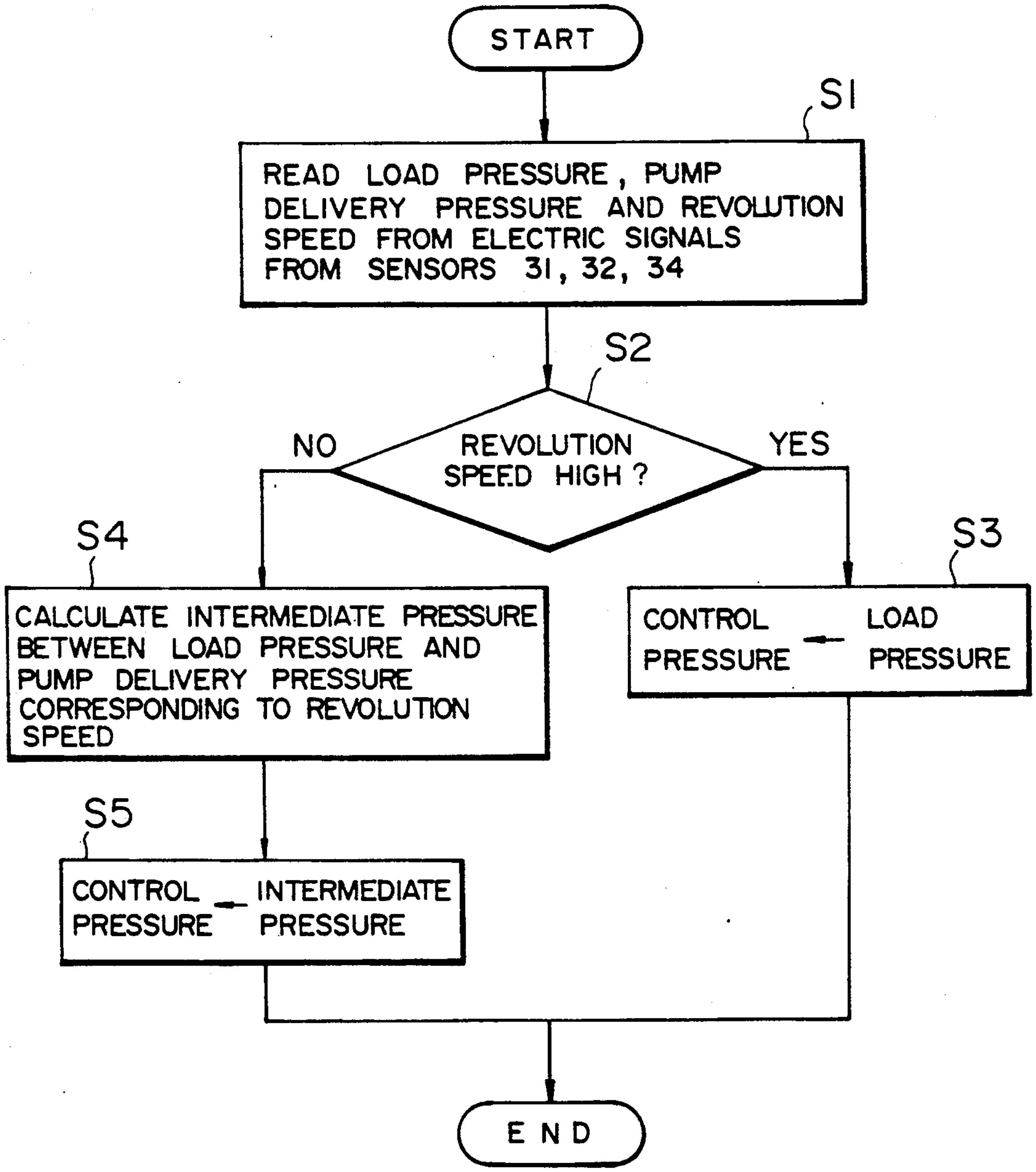
FIG. 8 is a flow chart which illustrates the process of calculating the control pressure, the calculating being performed by the controller shown in FIG. 6.

The process of calculating the control pressure performed in the controller 36 is shown in FIG. 8 as a flow chart. In step S1, the load pressure, the pump delivery pressure and the revolution speed of the prime mover 25 are read from electric signals transmitted from the pressure sensors 31, 32 and the revolution-speed sensor 34. In step S2, it is then determined whether or not the revolution speed of the prime mover 25 is high, where a value near the maximum revolution speed of the prime mover 25 is usually used as the criterion for the above-described determination. If it has been determined that the revolution speed of the prime mover 25 is high, the flow advances to step S3 in which the load pressure is made the control pressure. If it is determined that the revolution speed of the prime mover 25 is not high, the flow advances to step S4 in which the intermediate pressure corresponding to the revolution speed of the prime mover 25 and between the load pressure and the pump delivery pressure is calculated from the load pressure and the pump delivery pressure. Then, the intermediate pressure thus calculated is then made the control pressure in step S5.

The solenoid valve 35 is operated in accordance with the electric signal corresponding to the control pressure thus calculated and creates the above-described control pressure from the delivery pressure from the hydraulic pump 1 so as to transmit it to the control conduit 22.

Therefore, in the normal operation in which the revolution speed of the prime mover 25 is high, the pressure which is the same as the load pressure acts, a the control pressure, on the pressure controller 5 and 15. Therefore, the differential pressure across the flow control valves 4 and/or 14 is maintained at the predetermined value which is substantially the same as the differential pressure between the pump delivery pressure and the pump pressure. In the case of the fine operation in which the revolution speed of the prime mover 25 is low, the intermediate pressure between the pump delivery pressure and the load pressure is made the control pressure. Therefore, the differential pressure across the flow control valves 4 and/or 14 is maintained at a value smaller than the predetermined value for the normal operation. As a result, the change in the quantity of the hydraulic fluid to be supplied to the hydraulic actuator with respect to the operation amount of the operating lever can be reduced, causing the fine operation to be conducted easily.

Therefore, according to this embodiment, the similar effect to that obtained in the first embodiment can be obtained. Furthermore, the selection of the control pressures can be automatically performed. Therefore, the structure can be further simplified and the handling facility can be improved similarly to the fourth embodiment.

Although the hydraulic circuit apparatus for the hydraulic excavator is described in the above-described embodiments, the present invention is not limited to the above-described description. The present invention can, of course, be applied to the hydraulic circuit system for other working machines.

INDUSTRIAL APPLICABILITY

As described above, according to the present invention, either the pressure which is the same as the load pressure or the intermediate pressure between the load pressure and the pump delivery pressure is selectively created corresponding to the normal operation or the fine operation, and the thus created pressure is caused to act, as the control pressure, on the pressure control means for controlling the differential pressure across the flow control valve. As a result, the differential pressure across the flow control valve can be reduced at the fine operation, causing the change in the quantity of the hydraulic fluid to be supplied with respect to the operation amount of the operating lever to be reduced. Therefore, even if the load sensing system is employed, the fine operation can be easily performed. Furthermore, the efficient system can be constituted since the control pressure is built up from the two existing pressures, the load pressure and the pump delivery pressure, by adding a relatively simple structure.

Although the invention has been described in its preferred form with a certain degree of particularly, it is understood that the present disclosure of the preferred from has been changed in the details of construction and the combination and arrangement of parts may be restored to without departing from the spirit and the scope of the invention as hereinafter claimed.

We claim:

1. A hydraulic circuit system for a working machine having a hydraulic-fluid supply source, at least one hydraulic actuator operated by hydraulic fluid from said hydraulic-fluid supply source, a flow control valve for controlling the flow of said hydraulic fluid to be supplied to said actuator; and pressure control means for maintaining the differential pressure across said flow control valve at a predetermined value, said hydraulic circuit system comprising:

first means for selectively creating, from a load pressure of said actuator and a supply pressure from said hydraulic-fluid supply source, either a pressure which is the same as said load pressure or an intermediate pressure higher than said load pressure but lower than said supply pressure and transmitting said created pressure as a control pressure;

second means for operating said first means for instructing to select, as said control pressure, either said pressure which is the same as said load pressure or said intermediate pressure; and connection means for introducing said control pressure into said pressure control means, whereby said pressure control means maintains said differential pressure at said predetermined value when said control pressure is the same as said load pressure, while making said differential pressure lower than said predetermined value when said control pressure is said intermediate pressure.

2. A hydraulic circuit system for a working machine according to claim 1, wherein said first means comprises a conduit having an end portion to which said load pressure is introduced and another end portion to which said supply pressure is introduced, a fixed throttle and a variable throttle disposed in said conduit, said second means includes means for adjusting the opening of said variable throttle, and said connection means is connected to a portion between said fixed throttle and said variable throttle in said conduit.

3. A hydraulic circuit system for a working machine according to claim 2, wherein said fixed throttle is disposed in a portion of said conduit to which said load pressure is introduced, said variable throttle is disposed in a portion of said conduit to which said supply pressure is introduced, and said second means closes said variable throttle when said load pressure is selected, and opens said variable throttle to a given opening when said intermediate pressure is selected.

4. A hydraulic circuit system for a working machine according to claim 1, wherein said first means includes a conduit having an end portion to which said load pressure is introduced and another end portion to which said supply pressure is introduced, a fixed throttle and a variable pressure-control valve disposed in said conduit, said second means includes means for adjusting a setting value of said variable pressure-control valve, and said connection means is connected to a portion of said conduit between said fixed throttle and a variable pressure-control valve in said conduit.

5. A hydraulic circuit system for a working machine according to claim 4, wherein said variable pressure-control valve is disposed in a portion of said conduit to which said load pressure is introduced, said fixed throttle is disposed in a portion of said conduit to which said supply pressure is introduced, and said second means makes said setting value of said variable pressure-control valve zero when said load pressure is selected, and changes said setting value of said variable pressure-control valve to a given value other than zero.

6. A hydraulic circuit system for a working machine according to claim 1, wherein said first means includes means for detecting said load pressure, means for detecting said supply pressure, means for calculating said control pressure from said detected load pressure and supply pressure and means arranged to be controlled in accordance with said calculated control pressure for generating said control pressure.

7. A hydraulic circuit system for a working machine according to claim 1, wherein said second means includes means operated by an operator for operating said first means.

8. A hydraulic circuit system for a working machine according to claim 1, wherein said hydraulic-fluid supply source includes a hydraulic pump and a prime mover for operating said hydraulic pump and said second means includes means for operating said first means in accordance with the revolution speed of said prime mover.

9. A hydraulic circuit system for a working machine according to claim 8, wherein said second means includes means for operating said first means in synchronization with means for instructing a target revolution speed of said prime mover.

10. A hydraulic circuit system for a working machine according to claim 8, wherein said second means includes means for detecting the actual revolution speed of said prime mover and means for operating said first means in accordance with the thus detected actual revolution speed.

11. A hydraulic circuit system for a working machine according to claim 6, wherein said second means includes means for transmitting information serving as the base of said selection and said means for calculating said control pressure receives said information and calculates either said pressure which is the same as said load pressure or said intermediate pressure as said control pressure in accordance with said received information.

12. A hydraulic circuit system for a working machine according to claim 1, wherein said pressure control means includes a pressure controller disposed in the downstream side of said flow control valve.

13. A hydraulic circuit system for a working machine according to claim 1, wherein said pressure control means includes a pressure compensating valve disposed in the upstream side of said flow control valve.

* * * * *